(12) United States Patent
Ohashi et al.

(10) Patent No.: US 12,222,728 B2
(45) Date of Patent: Feb. 11, 2025

(54) IMAGE RECOGNIZING DEVICE AND IMAGE RECOGNIZING METHOD

(71) Applicant: Faurecia Clarion Electronics Co., Ltd., Saitama (JP)

(72) Inventors: Akira Ohashi, Saitama (JP); Daisuke Fukuda, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 326 days.

(21) Appl. No.: 17/967,166

(22) Filed: Oct. 17, 2022

(65) Prior Publication Data
US 2023/0118926 A1    Apr. 20, 2023

(30) Foreign Application Priority Data
Oct. 20, 2021   (JP) ................ 2021-171352

(51) Int. Cl.
| | |
|---|---|
| G05D 1/00 | (2024.01) |
| G06T 3/047 | (2024.01) |
| G06T 7/13 | (2017.01) |
| G06T 7/73 | (2017.01) |
| G06V 20/58 | (2022.01) |

(52) U.S. Cl.
CPC .......... G05D 1/0246 (2013.01); G06T 3/047 (2024.01); G06T 7/13 (2017.01); G06T 7/73 (2017.01); G06V 20/58 (2022.01); *G06T 2207/30261* (2013.01)

(58) Field of Classification Search
None
See application file for complete search history.

(56) References Cited

FOREIGN PATENT DOCUMENTS

EP    3978870 A1    4/2022

*Primary Examiner* — Jaime Figueroa
*Assistant Examiner* — Arslan Azhar
(74) *Attorney, Agent, or Firm* — Tucker Ellis LLP (57) ABSTRACT

An image recognizing device includes an image storing portion, a cylindrical distortion correcting portion, a vertical edge extracting portion; a column candidate extracting portion, a pole candidate evaluating portion, a pole foot position setting portion, a movement distance acquiring portion, a detected distance difference calculating portion, and a pole identifying portion. When the vehicle is moving toward a pole candidate, the movement distance acquiring portion acquires a movement distance moved by the vehicle during a prescribed time interval, and the detected distance difference calculating portion calculates a detected distance difference between a starting detected distance and an ending detected distance for the prescribed time interval. The pole identifying portion identifies that a pole candidate wherein the absolute value of the difference between the movement distance and the detected distance difference is less than a threshold value as being a pole that has a pole foot position that contacts the ground.

6 Claims, 8 Drawing Sheets

IMAGE RECOGNIZING DEVICE AND IMAGE RECOGNIZING METHOD

CROSS-REFERENCE TO RELATED APPLICATION

The present application is based on and claims priority to Japanese patent application No. 2021-171352 filed on Oct. 20, 2021, the disclosure of which is hereby incorporated by reference in its entirety.

FIELD OF THE INVENTION

A present disclosure relates to an image recognizing device and image recognizing method.

BACKGROUND

Conventionally, there are known pole detecting devices and pole detecting methods able to identify the positional relationship with a vehicle despite being a pole wherein corner portions cannot be detected. A pole detecting device comprises: a vertical edge detecting portion for detecting a vertical edge in one of a time series of subject images taken with different timings in a time series; a tracking point setting portion for setting a plurality of tracking points that are lined up in the vertical direction on the vertical edge; a corresponding point detecting portion for detecting, in another subject image, corresponding points that correspond to the tracking points; a vertical edge identifying portion for identifying a vertical edge, in the subject image, wherein the corresponding points are lined up in the vertical direction; and a pole position detecting portion for detecting the position of a pole with the vertical edges based on the individual coordinate locations of corresponding intersections in two subject images and the positions of the vehicle when the subject images were captured (See Patent Document 1: JP 2020-197826A1).

However, in the conventional device, when detecting the location of the pole with the vertical edge, the location of the pole is detected through image processing based on a camera image. Because of this, when a pole that stands on the ground is present in the vicinity of a vehicle, if there is a reflection of the pole on the surface of the road in the direction that extends from the foot of the pole, the conventional device will end up identifying the existence of a pole wherein the pole image that is reflected on the road surface is added to the actual pole in the camera image. Because of this, when the vehicle is moving toward the pole and the distance from the vehicle to the pole is detected based on the camera image, the detected distance will be nearer than the actual distance (the true value) from the vehicle to the pole, and thus the conventional device falsely detects the distance from the vehicle to the pole.

The present disclosure was created focusing on this issue, and the object thereof is to prevent false detection of the distance from the vehicle to the pole by detecting the nearness to the pole through a camera image when a vehicle is moving toward the pole.

SUMMARY

An image recognizing device, includes:
a surroundings state acquiring portion configured to acquire a state of surroundings that changes accompanying movement of a vehicle on which a camera is mounted through time-series camera image information;
a vertical edge extracting portion configured to extract, as a vertical edge, a part where there is a change in pixel brightness of no less than a prescribed value when the camera image information is scanned in the horizontal direction;
a column candidate extracting portion configured to extract, as a column candidate, a pair of edges found when the vertical edges are searched for pairs of a plus edge peak and a minus edge peak;
a pole candidate evaluating portion configured to evaluate whether or not a column candidate satisfies a pole evaluation condition and evaluate a column candidate that satisfies the pole evaluation condition as a pole candidate standing on the ground;
a pole foot position setting portion configured to set a bottommost end position of a vertical edge image wherein a pole candidate appears as a pole foot position;
a movement distance acquiring portion configured to acquire a movement distance moved by the vehicle during a prescribed time when the vehicle is moving toward the pole candidate;
a detected distance difference calculating portion configured to calculate a detected distance difference between a starting detected distance and an ending detected distance for the prescribed time by detecting the horizontal distance from the camera position to the pole foot position when the vehicle is moving toward the pole candidate; and
a pole identifying portion configured to identify, the edge position of the bottommost end of the pole candidate where the absolute value of a difference between the movement distance and the detected distance difference is less than a threshold value, as the pole foot position of the pole.

An image recognizing device method for identifying a pole that is standing on the surface of the ground, based on camera image information, wherein:
a state of surroundings that changes accompanying movement of a vehicle on which a camera is mounted is acquired through time series camera image information;
a part wherein a change of no less than a prescribed value is produced in the brightness of pixels when the camera image information is scanned in the horizontal direction is extracted as a vertical edge;
a pair of edges found when the vertical edges are searched for pairs of a plus edge peak and a minus edge peak is extracted as a column candidate;
whether or not a column candidate satisfies a pole evaluation condition is evaluated to evaluate, as a pole candidate that stands on the surface of the ground, a column candidate that satisfies the pole evaluation condition;
a bottommost end position of a vertical edge image wherein a pole candidate appears is set as a pole foot position;
a movement distance moved by the vehicle over a prescribed time interval when the vehicle is moving toward the pole candidate is acquired;
a detected distance difference between a starting detected distance and an ending detected distance for a prescribed time interval is calculated by detecting the horizontal distance from the camera position to the pole foot position when the vehicle is moving toward the pole candidate; and
a pole candidate wherein the absolute value of a difference between the movement distance and the detected distance difference is less than a threshold value is identified as a pole that has, as the pole foot position, a position that is in contact with the ground.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Forms for carrying out the image recognizing device and image recognizing method according to the present disclosure will be explained below based on Embodiment 1, depicted in the drawings.

Embodiment 1

An image recognizing device 100 of a first embodiment is a device that is applied to a collision damage mitigating braking system A for avoiding a collision with an obstacle, through actuating automatic braking when a vehicle approaches an obstacle through forward travel or travel in reverse.

Figure 1:
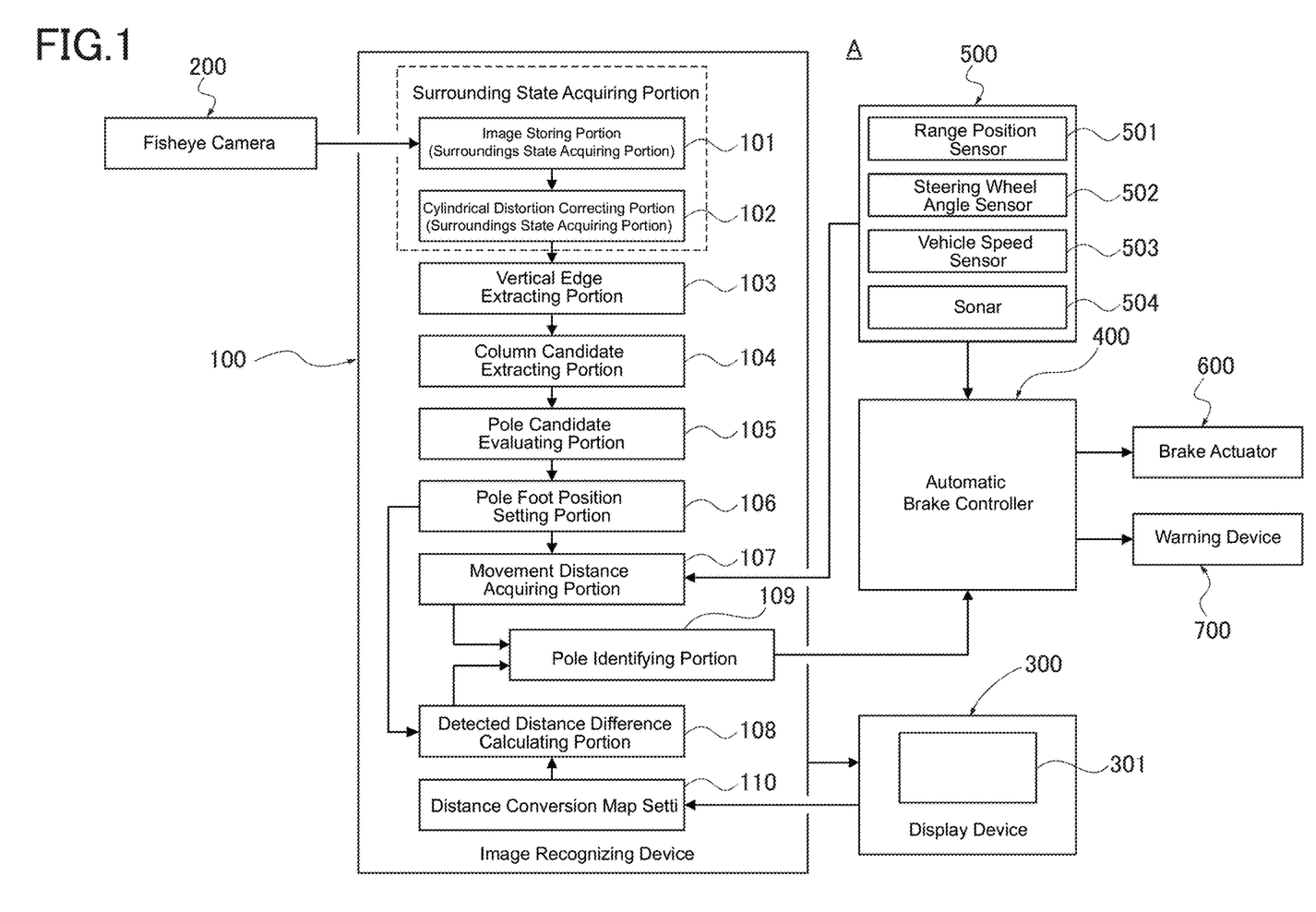
FIG. 1 is a block diagram depicting the overall structure of a collision damage mitigating braking system to which the image recognizing device of a first embodiment is applied.

FIG. 1 will be referenced first to explain the overall structure of the collision damage mitigating braking system A. Here the collision damage mitigating braking will be termed "AEB" (an abbreviation for "Autonomous Emergency Braking").

The collision damage mitigation braking system A comprises an image recognizing device 100, a fisheye camera 200 (camera), a display device 300, an automatic brake controller 400, input sensors 500, a brake actuator 600, and a warning device 700, which are all installed in a vehicle.

The image recognizing device 100 carries out image processing on camera image information from the fisheye camera 200, and, if necessary, displays an image of the state of the surroundings of the vehicle on a display screen 301 of the display device 300. An obstacle identifying function for outputting, to the automatic brake controller 400, approach distance information for approaching an obstacle (which may be a stationary object or a moving object) in the surroundings of the vehicle, recognized from a camera image, is added to the image recognizing device 100. Moreover, a pole identifying function for outputting, to the automatic brake controller 400, approach distance information for approaching a pole P, by recognizing a pole P of a circular column shape (which, among all obstacles, tends to be difficult to detect by a sonar 504 alone), is also added. Note that the detailed structure by which to achieve the pole identifying function in the image recognizing device 100 will be described below.

The fisheye camera 200 is a camera that uses a fisheye lens that is able to perform imaging with a wide viewing angle range of no less than about 180°, despite having a short focal distance and distorting the imaging subject. The fisheye camera 200 of the first embodiment is used for both the forward camera and the rearward camera of four-direction cameras that are installed on the front, rear, left, and right of the vehicle, to be used in a system that monitors in all directions, for example. Note that the system that monitors in all directions is a system that aids in smooth parking by enabling checking, with a single glance, the relationship between the vehicle and the parking position when parking in a parking garage or performing parallel parking, doing so through a viewpoint-converted image that is displayed on the display screen 301 of the display device 300. A "viewpoint-converted image" refers to an image from an overhead viewpoint, as if looking downward from directly above the vehicle, where the image signals acquired from the cameras in the four directions are subjected to a real-time viewpoint conversion process. Given this, the system for monitoring all directions is achieved through a process of compositing, into a single image with the vehicle in the center, the images from the four cameras, images that have been subjected to the viewpoint converting process.

The display device 300 has a display screen 301 that displays the camera images after image processing. For example, when the vehicle is traveling at a low speed in reverse, the camera image from the fisheye camera 200, after image processing, is displayed based on a display command from the image recognizing device 100.

When the vehicle approaches an obstacle, the automatic brake controller 400 carries out braking control that automatically actuates the brakes of the vehicle prior to the vehicle colliding with an obstacle, based on the approach distance information for the obstacle. The automatic brake controller 400 inputs a pole identification result from the pole identifying portion 109 of the image recognizing device 100. Additionally, if the identification result is that there is a pole P standing on the ground, the horizontal distance (=detected distance L') to the pole foot position F of the pole P, calculated based on the camera image information, is used as the approach distance information. On the other hand, if the identification result is that there is no pole P standing on the ground, a distance detection value through a sonar 504 (an obstacle distance sensor), rather than the fisheye camera 200, is used for the approach distance information. That is, the automatic brake controller 400 acquires the approach distance information through sensor fusion of the fisheye camera 200 and the sonar 504, to control through having the fisheye camera 200 and the sonar 504 cover for each other's weaknesses.

The input sensors 500 are a plurality of sensors and switches that provide the necessary information to the automatic brake controller 400 and the image recognizing device 100. The input sensors 500 include, for example, a range position sensor 501, a steering wheel angle sensor 502, a vehicle velocity sensor 503, the sonar 504 (the obstacle distance sensor), and the like.

The range position sensor 501 is a sensor that detects the range position selected in the automatic transmission within the vehicle, to acquire information on the direction of travel of the vehicle (forward travel, travel in reverse, etc.). The steering wheel angle sensor 502 is a sensor for detecting the steering wheel angle due to the driver steering the steering wheel, to acquire steering wheel angle information (traveling in a straight line, turning, and the like).

The vehicle velocity sensor 503 is a sensor for detecting the velocity of the vehicle. When a prescribed time interval is set, the distance the vehicle has moved over the prescribed time interval can be found through calculating using the average vehicle velocity and the prescribed time interval.

The sonar 504 is an example of an obstacle distance sensor that uses ultrasound to detect the distance to an obstacle through the use of signals reflected from the obstacle. The sonar 504 in the first embodiment may use both the front center sonar and the rear center sonar when a front center sonar, a rear center sonar, and four corner sonars are provided to monitor the state of surroundings of the vehicle. Note that while the sonar 504 is used as an example of an obstacle distance sensor, the obstacle distance sensor may use another obstacle distance sensor such as a laser radar, a milliwave radar, a laser rangefinder, or the like, instead of the sonar 504.

The brake actuator 600 is an actuator for automatically actuating the brakes of the vehicle based on a brake actuation command from the automatic brake controller 400. The warning device 700 issues a warning to the driver or passengers based on a warning actuation command from the automatic brake controller 400. In the automatic brake controller 400, approach distance information and a collision allowance time TTC (an abbreviation for "Time-To-Collision") are used to carry out automatic braking control that uses a combination warnings and brake actuation.

FIG. 1 through FIG. 10 will be referenced next to explain a detailed structure for achieving the pole recognition function in the image recognizing device 100.

The image recognizing device 100, as illustrated in FIG. 1, comprises an image storing portion 101 (surroundings state acquiring portion), a cylindrical distortion correcting portion 102 (surroundings state acquiring portion), a vertical edge extracting portion 103, a column candidate extracting portion 104, a pole candidate evaluating portion 105, and a pole foot position setting portion 106. In addition, it further comprises a movement distance acquiring portion 107, a detected distance difference calculating portion 108, a pole identifying portion 109, and a distance conversion map setting portion 110. The various structural elements will be explained below.

Figure 2:
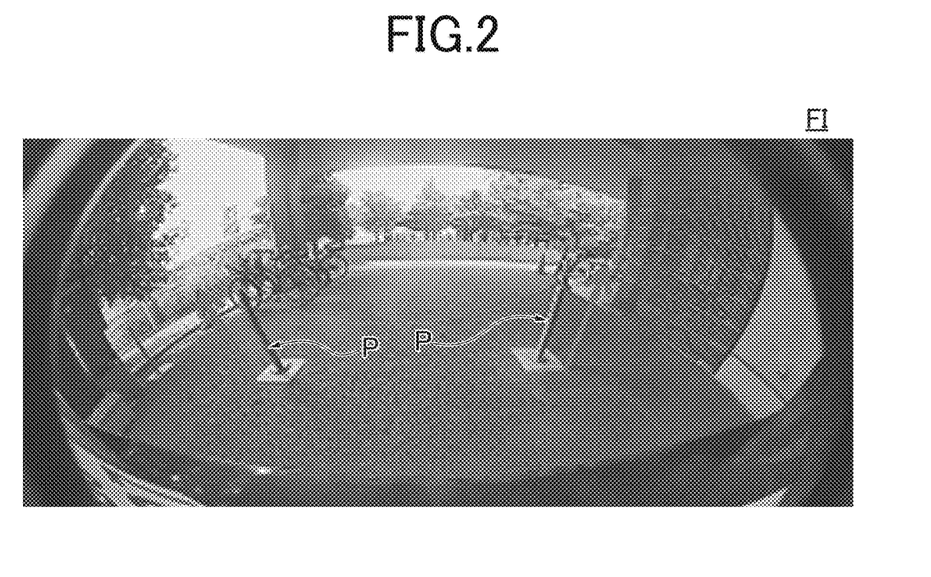
FIG. 2 is a diagram depicting an example of a fisheye image, from a fisheye camera, stored in an image storing portion of an image recognizing device.
Figure 3:
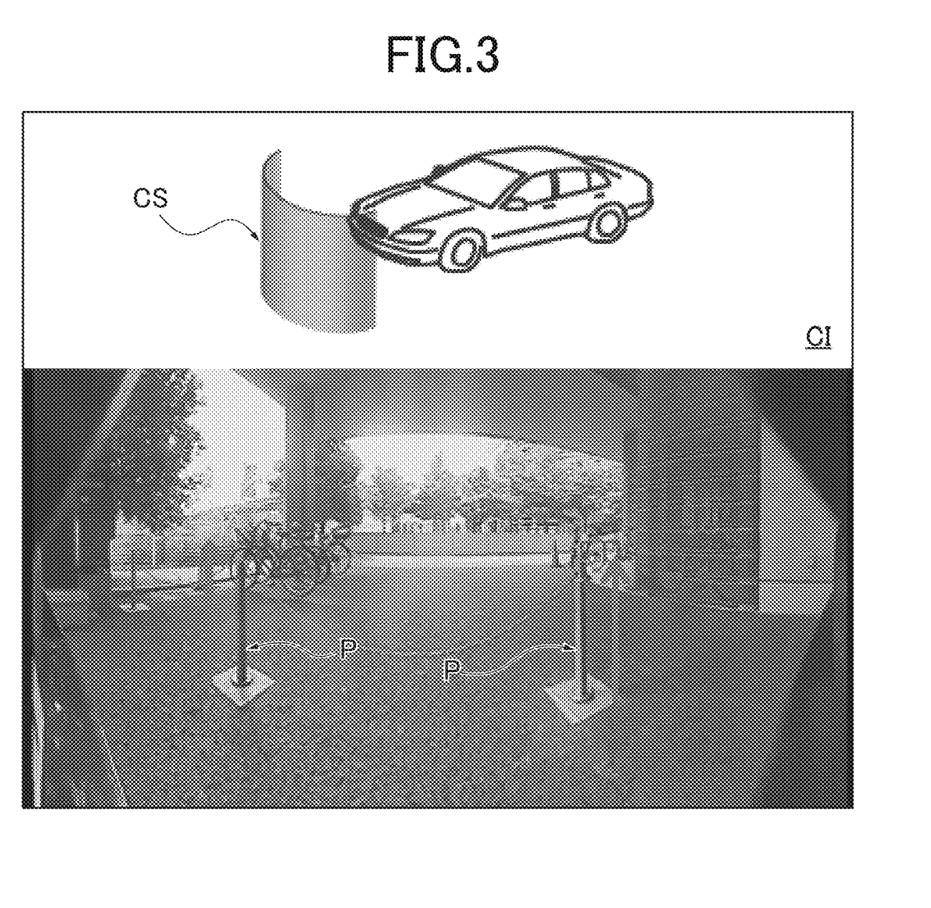
FIG. 3 is a diagram depicting an example of a cylindrical distortion corrected image wherein the fisheye image has undergone correction through a projection onto a round cylinder that is perpendicular to the surface of the road, in a cylindrical distortion correcting portion of the image recognizing device.

The image storing portion 101 stores, as a time series, fisheye images FI acquired from the fisheye camera 200. Here, as illustrated in FIG. 2, if a pair of poles P and P are present at positions on the left and right of the screen in the fisheye image FI, the directions of the two poles P and P within the image will be disrupted through the effect of lens distortion. The pole P on the left side forms a shape where it stands in a direction that rises angled to the left from the foot position. The pole P on the right side forms a shape where it stands in a direction that rises angled to the right from the foot position.

The cylindrical distortion correcting portion 102 performs image conversion, into cylindrical distortion corrected images CI, of the fisheye images FI that are stored in the image storing portion 101. Here, for the cylindrical distortion corrected images CI, conversion into a distortion corrected image wherein there is no distortion in the vertical direction is possible through carrying out image conversion by projecting onto a round cylindrical surface screen CS that is perpendicular to the surface of the road, as depicted at the top in FIG. 3. The pair of poles P and P in the cylindrical distortion corrected image CI each becomes a shape that stands directly in the vertical direction from the foot position thereof, as depicted at the bottom in FIG. 3. Note that in the first embodiment, the surroundings state acquiring portion that acquires, through the time series camera image information, the state of surroundings that changes according to the movement of the vehicle on which the fisheye camera 200 is equipped is structured from the image storing portion 101 and the cylindrical distortion correcting portion 102 (referencing FIG. 1).

Figure 4:
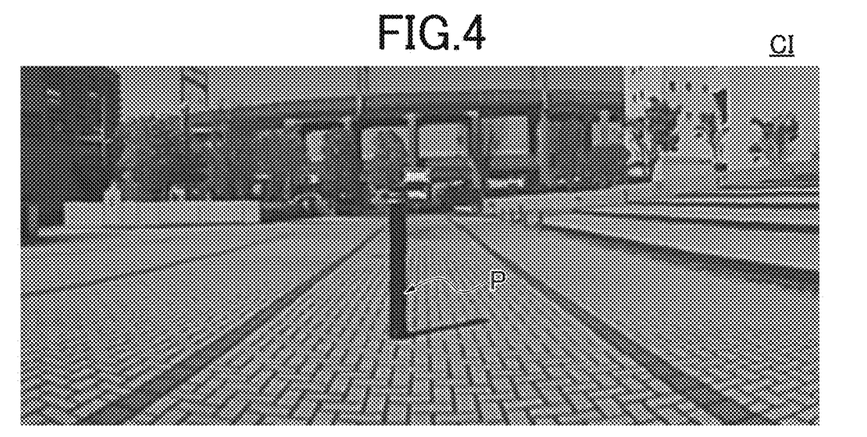
FIG. 4 is a diagram depicting an example of a cylindrical distortion corrected image that includes a pole.
Figure 5:
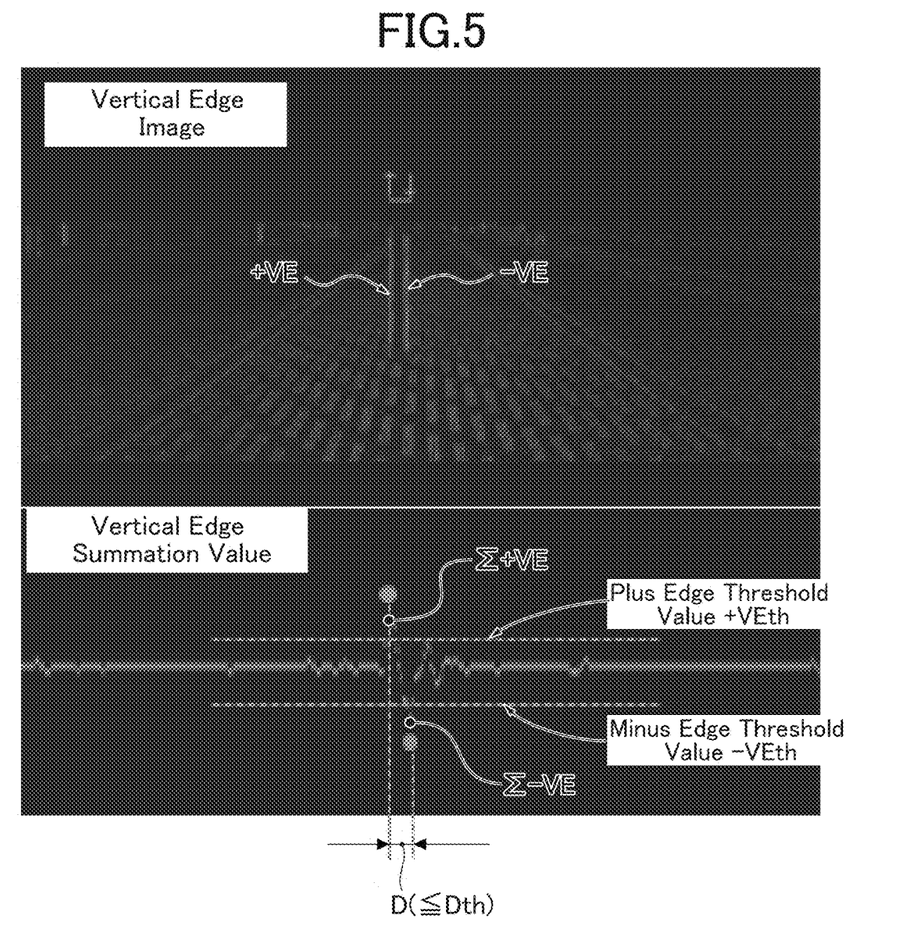
FIG. 5 is a diagram depicting a vertical edge image extracted from a cylindrical distortion corrected image (FIG. 4), in the vertical edge extracting portion of the image recognizing device, and a graph of the vertical edge summation value used in extracting and evaluating column candidates in the column candidate extracting portion.

The vertical edge extracting portion 103 extracts, as a vertical edge VE, a part wherein a change of no less than a prescribed value is produced in the pixel brightness when the cylindrical distortion corrected image CI (the camera image information) is scanned multiple times, with equal spacing, in the horizontal direction. Here the "vertical edge VE" includes both parts wherein the pixel brightness has a change of no less than a prescribed value from a high brightness to a low brightness (termed a "plus edge," below), and parts wherein the pixel brightness has a change of no less than a prescribed value from a low brightness to a high brightness (termed a "minus edge," below). For example, let us assume an image where a single pole P is present in the middle of the cylindrical distortion corrected image CI, as illustrated in FIG. 4. In this case, the vertical edge image produced through extraction of the vertical edges VE would be an image with a pair of edges, the plus edge +VE and the minus edge −VE, in the vertical direction along the edges on both sides of the pole P, as depicted at the top of FIG. 5.

The column candidate extracting portion 104 extracts, as column candidates, pairs of edges that are found when searching for the vertical edges VE for plus edge +VE peaks that are paired with minus edge −VE peaks. Here the column candidate extracting portion 104 extracts, as column candidates, those pairs that satisfy both a summation value condition and a horizontal distance condition. The summation value condition is a condition wherein, as depicted at the bottom of FIG. 5, the vertical direction summation value Σ+VE of the plus edge +VE is a peak position that is no less than a plus edge threshold value +VEth, and the vertical direction summation value Σ−VE of the minus edge −VE is a peak position that is no greater than a minus edge threshold value −VEth. The horizontal distance condition is a condition that the horizontal distance D between the plus edge +VE peak position and the minus edge −VE peak position is no greater than a distance threshold value Dth, as depicted at the bottom of FIG. 5. Note that the distance threshold value Dth is set to a value so as to include pole members with circular column shapes that are used in, for example, demarcating areas wherein travel is prohibited, and, of circular column-shaped obstacles that extend vertically from the road surface, have diameters that are less than those of telephone poles.

The pole candidate evaluating portion 105 evaluates the column candidates, extracted by the column candidate extracting portion 104, as to whether or not they satisfy pole evaluation conditions, to evaluate those column candidates that satisfy the pole evaluation conditions as pole candidates P' that are standing on the ground. Here the pole candidate evaluating portion 105 performs the evaluation using an edge quantity condition, an edge width condition, and an edge direction condition has the pole evaluation conditions in an image region below the vicinity of the horizon line in the cylindrical distortion corrected image CI (camera image information). Given this, the pole candidate evaluating portion 105 evaluates as a pole candidate P' that is standing on the ground, a column candidate that satisfies all of the pole evaluation conditions.

Figure 6:
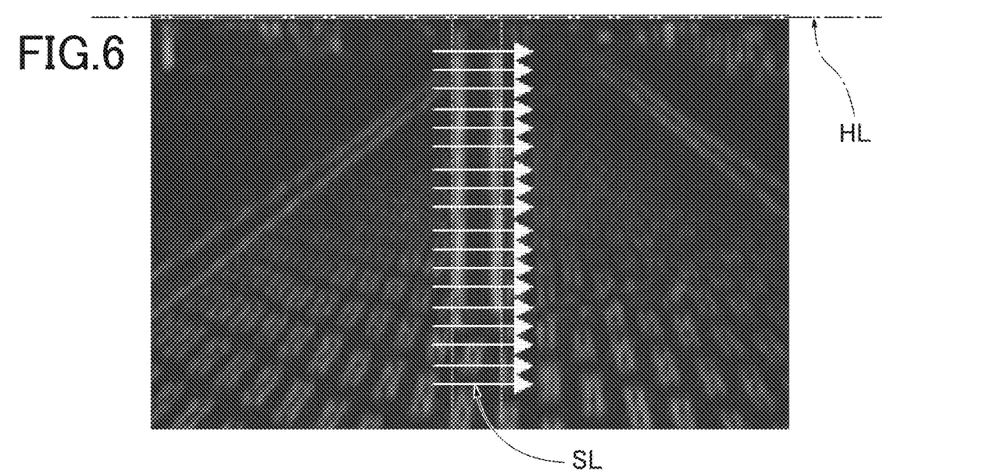
FIG. 6 is an explanatory diagram depicting an edge quantity condition for evaluating a pole candidate in the pole candidate evaluating portion of the image recognizing device.

Image region preconditions are applied to regulate the image regions for which the pole candidates P' are evaluated. The image region preconditions define the image region below a crosswise direction line HL, as illustrated in FIG. 6, by drawing the crosswise direction line HL at a position in the vicinity of the horizon line in the cylindrical distortion corrected image CI that is based on the camera image. Thus with a column candidate at a position that is higher than the horizon line and that does not extend from the ground, the pole foot position will not be on the ground, and will be excluded as not satisfying the image region precondition.

The edge quantity condition is a condition that is evaluated as satisfied when the edge quantities of the right edge and left edge of a column candidate are no less than a threshold value. Here the "threshold value" is set to a value such that the evaluation is satisfied when left and right edges that are continuous in the vertical direction are extracted in a plurality of equally spaced scan lines SL for measuring the changes in brightness, indicated by the right arrows in FIG. 6. Thus column candidates wherein the left-right pairs of vertical edges are not continuous in the downward direction from the horizon line are excluded by the edge quantity condition not being satisfied.

Figure 7:
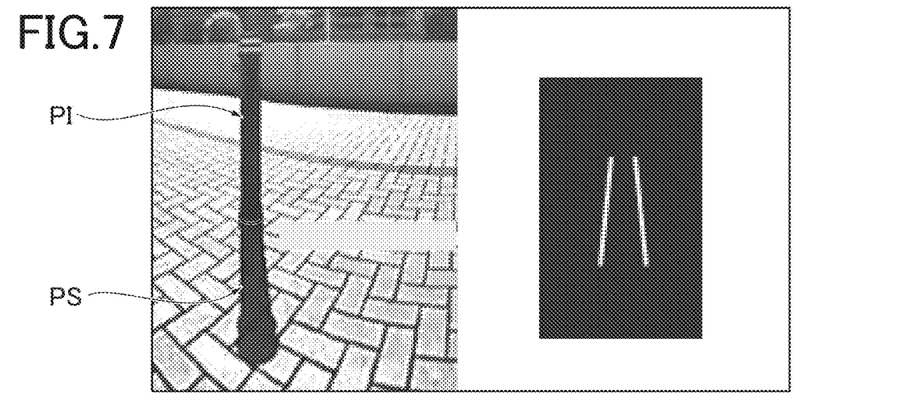
FIG. 7 is an explanatory diagram depicting an edge width condition for evaluating a pole candidate in the pole candidate evaluating portion of the image recognizing device.
Figure 8:
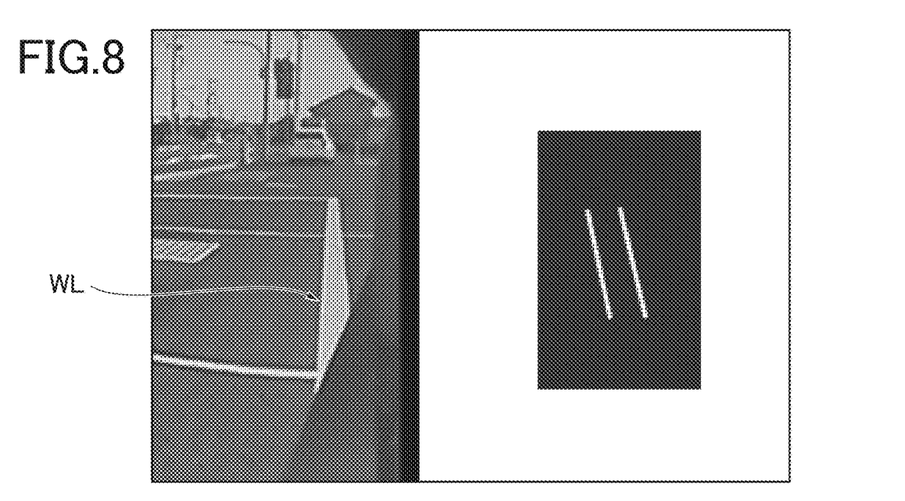
FIG. 8 is an explanatory diagram depicting an edge direction condition for evaluating a pole candidate in the pole candidate evaluating portion of the image recognizing device.

The edge width condition is a condition that is evaluated as satisfied if the variation in the width of the column candidate is no greater than a prescribed variation in width. Here the "prescribed variation in width" is set to a value that allows variability in the pixel units that are evaluated as satisfying the condition when the vertical edge width of the pair (the horizontal distances between the peak positions of the plus edge and the peak positions of the minus edge) can be viewed as substantially parallel. For a pole shadow PS that extends as-is from the bottom end of the pole P, the vertical edge width of the pair will be larger toward the downward direction, as illustrated in FIG. 7. Thus a column candidate from a pole wherein a pole shadow PS is seen will be excluded as not satisfying the edge width condition. Moreover, for road surface painting, such as white lines WL, or the like, that are painted on the road surface, column candidates wherein road surface painting wherein in the vertical edge width of the pair becomes larger in the downward direction is seen is also excluded due to not satisfying the edge width condition.

The edge direction condition is a condition wherein both the edge peaks of the column candidate being in the vertical direction satisfies the evaluation. Here the "vertical direction" refers to the direction that is evaluated as satisfied allowing for conversion error tolerance when a fisheye image FI is converted into a cylindrical distortion corrected image CI. For road surface painting, such as white lines WL, or the like, painted on the road surface, the direction will appear slanted in the cylindrical distortion corrected image CI, as illustrated in the FIG. 8. Thus the column candidates caused by road surface painting will be excluded as not satisfying the edge direction condition. Note that column candidates wherein a pole shadow PS that extends bending from the bottom end of the pole P appears can also be excluded as not satisfying the edge direction condition.

Figure 9:
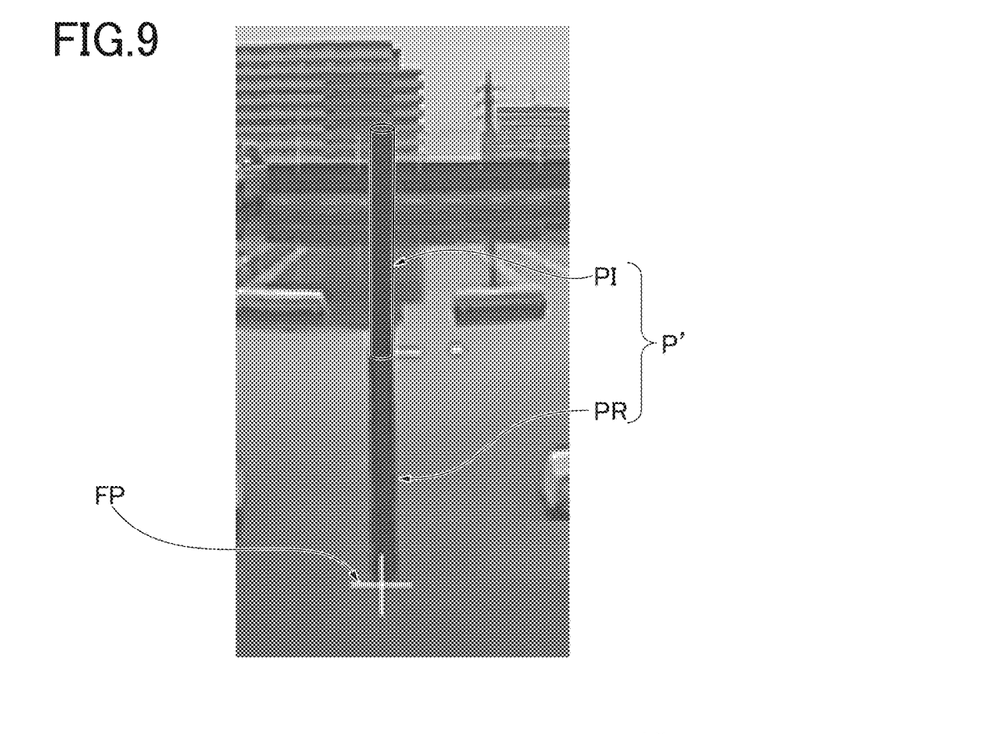
FIG. 9 is an explanatory diagram depicting a foot position that is set when the entirety of a pole has undergone water film surface reflection in a puddle at the pole foot in a pole foot position setting portion of the image recognizing device.

The pole foot position setting portion 106 sets, as the pole foot position FP, the edge position of the bottommost end of the vertical edge image where a pole candidate P' that satisfies the pole evaluation conditions appears. For example, as illustrated in FIG. 9, if there is a puddle at the foot of a pole P, and there is a reflection of the pole P that extends in the length direction of the pole P from the foot of the pole P, the existence of a pole with a length wherein the pole image PR that is reflected on the road surface is added to the actual pole image PI will end up being identified in the camera image. That is, a pole of a length wherein the reflected pole image PR is added to the actual pole image PI will be evaluated as a pole candidate P', and, as illustrated in FIG. 9, the pole foot position FP will be set to the position of the bottommost point of the reflected pole image PR (the tip end position of the pole P through the reflection in the mirroring surface).

Figure 10:
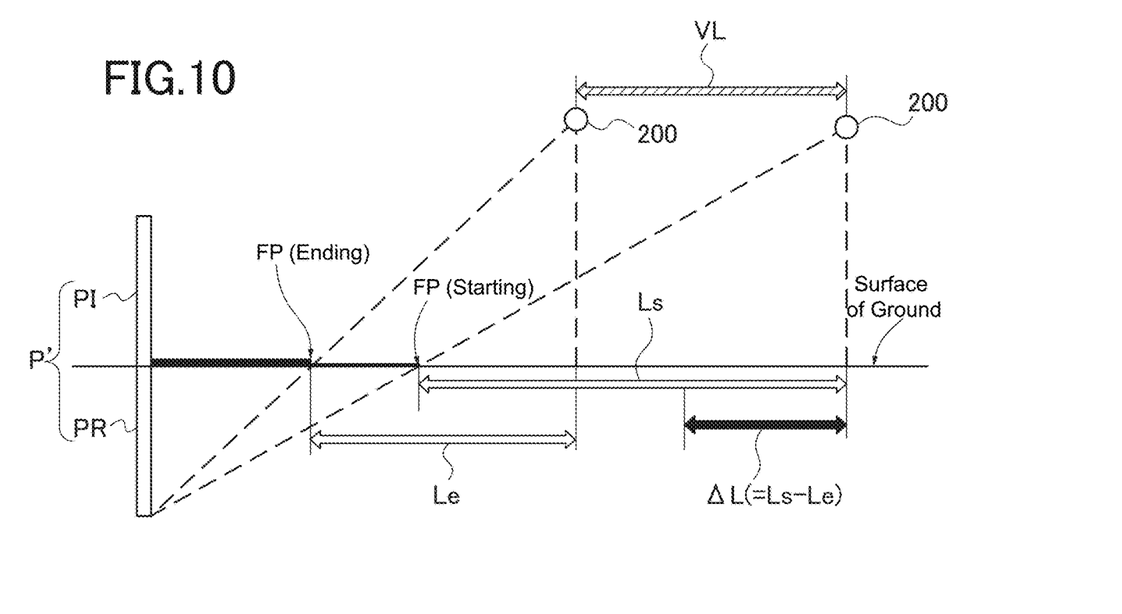
FIG. 10 is an explanatory diagram depicting an evaluation technique when the foot position has been set to the bottom end position of the water film surface reflected image of the pole, in the pole identifying portion of the image recognizing device.

When the vehicle moves to approach the pole candidate P', the movement distance acquiring portion 107 acquires a movement distance VL moved by the vehicle during the prescribed time interval (referencing FIG. 10). With the movement distance acquiring portion 107 according to the first embodiment, a starting vehicle velocity is read in from the vehicle velocity sensor 503 at the start of the prescribed time interval, and an ending vehicle velocity is read in from the vehicle velocity sensor 503 at the end of the prescribed time interval. An average vehicle velocity is calculated from the starting vehicle velocity and the ending the vehicle velocity, and the movement distance VL moved by the vehicle during the prescribed time interval is acquired by multiplying the average vehicle velocity by the prescribed time interval. Note that if location information for the vehicle can be acquired accurately using a GPS, or the like, the movement distance VL moved by the vehicle may be acquired through another technique instead, such as calculating the movement distance from the vehicle position at the start of the prescribed time interval and the vehicle position at the end of the prescribed time interval.

When the vehicle moves approaching the pole candidate P', the detected distance difference calculating portion 108 detects the horizontal distance from the position of the camera to the pole foot position FP, and calculates a detected distance difference ΔL between the detected distance Ls at the start of the prescribed time interval and the detected distance Le at the end thereof (referencing FIG. 10).

Here, in the first embodiment, the display device 300 that has the display screen 301 for displaying the time series camera image information and the distance conversion map setting portion 110 are used in calculating the starting detected distance Ls and the ending detected distance Le. The distance conversion map setting portion 110 sets a distance conversion map (such as a distance conversion formula, a distance conversion table, or the like) for converting the vertical direction coordinate position, on the screen, of the pole foot position FP that is displayed on the display screen 301, into the horizontal distance, from the position at which the fisheye camera 200 is installed, to the pole foot position FP. Given this, when a vertical direction coordinate location of the pole foot position FP on the display screen 301 is detected at the start of the prescribed time interval, the distance conversion map is used to find the starting detected distance Ls. When a vertical direction coordinate location of the pole foot position FP on the display screen 301 is detected at the end of the prescribed time interval, the distance conversion map is used to find the ending detected distance Le.

The pole identifying portion 109 identifies, as a pole P that has a pole foot position FP that is the position of contact with the ground, a pole candidate P' wherein the absolute value |VL−ΔL| of the difference between the movement distance VL and the detected distance difference ΔL (=Ls−Le) is less than a threshold value. Here the "threshold value" is set to a small value wherein a prescribed allowance for calculation error tolerances in the movement distance VL and the detected distance difference ΔL is applied, given that, in theory, the movement distance VL and the detected distance difference ΔL are identical, and have a difference of zero, for a pole P that has a pole foot position FP that is the position of contact with the ground.

Figure 11:
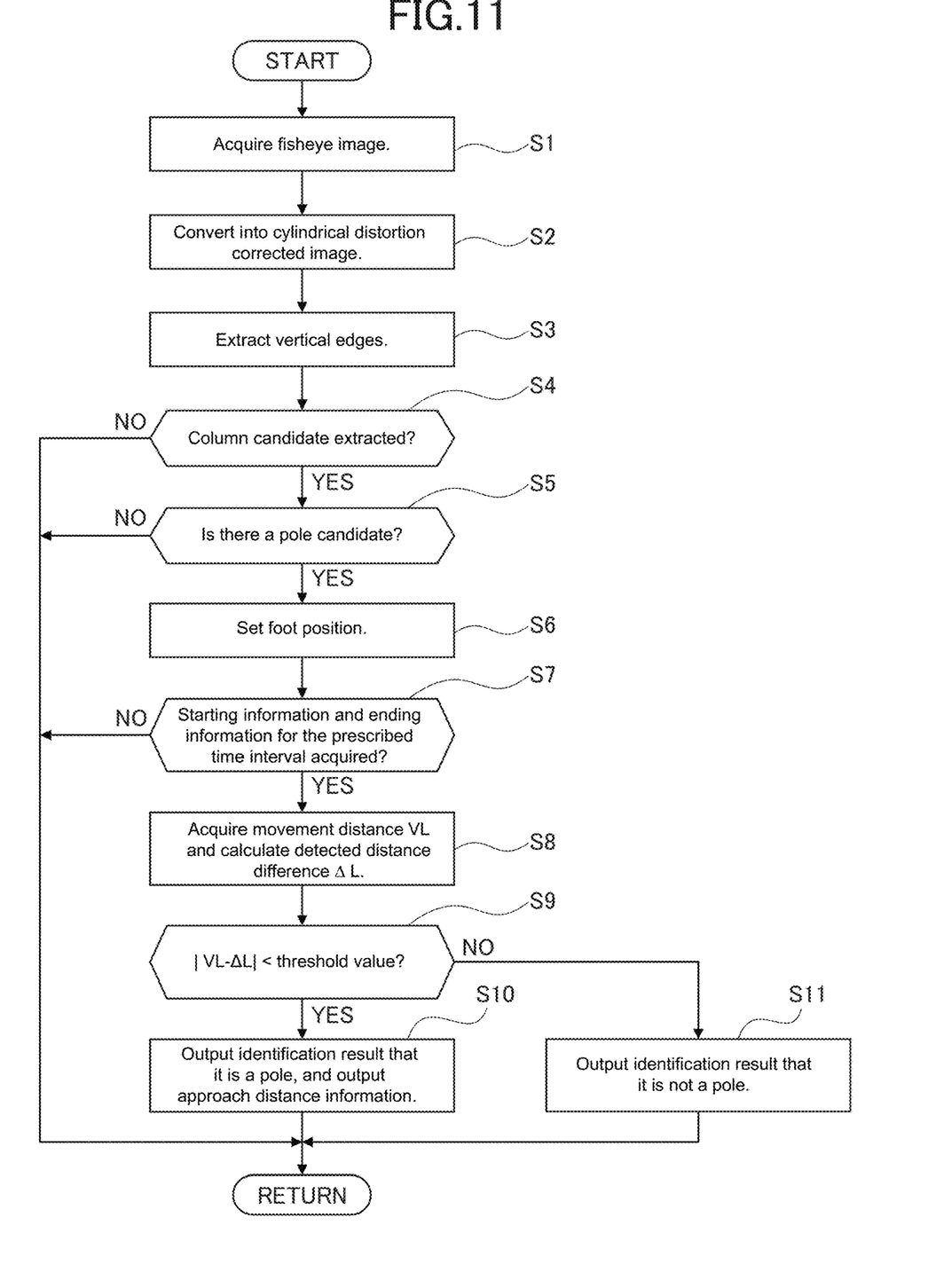
FIG. 11 is a flowchart showing the flow of the image recognizing process that is executed by the image recognizing device of the first embodiment.

The flowchart depicted in FIG. 11 will be referenced next to explain the image recognition process operation, executed by the image recognizing device 100, for evaluating whether or not a pole candidate P' is a pole P that has a pole foot position FP that is a position that is in contact with the ground.

In Step S1, when the vehicle in which the fisheye camera 200 is mounted moves, fisheye images FI are acquired in a time series for the surrounding state, which changes with the movement.

In Step S2, following the acquisition of the fisheye image FI in Step S1, the fisheye images FI that have been acquired in a time series are converted to cylindrical distortion corrected images CI (camera image information).

In Step S3, following the image conversion to the cylindrical distortion corrected images CI in Step S2, the parts wherein there is a change in pixel brightness of no less than a prescribed value when a cylindrical distortion corrected image CI is scanned in the horizontal direction are extracted as vertical edges VE.

In Step S4, following the extraction of the vertical edges VE in Step S3, whether or not to extract column candidates is evaluated through searching for edge pairs, by searching the vertical edges VE for plus edge +VE peak positions paired with minus edge −VE peak positions. If there is a YES evaluation through having extracted a column candidate wherein both the summation value condition and the horizontal distance condition are both satisfied for the edge pair, processing advances to Step S5. On the other hand, if the evaluation is NO because no column candidate has been extracted given that the summation value condition and the horizontal distance condition were not both satisfied for the edge pair, processing returns to the start.

In Step S5, following the evaluation that a column candidate was extracted in Step S4, whether or not the column candidate is a pole candidate P' is evaluated through evaluating whether or not the column candidate satisfies the pole evaluation conditions. If the evaluation is YES through all of the pole evaluation conditions being satisfied to evaluate that the column candidate is a pole candidate P' that is standing on the ground, processing advances to Step S6. On the other hand, if the evaluation is NO, through an evaluation that the column candidate is not a pole candidate P' that is standing on the ground, though not all of the pole evaluation conditions being satisfied, processing returns to the start.

In Step S6, following the evaluation in Step S5 that the column candidate is a pole candidate P', the position of the bottommost end of the vertical edge image wherein the pole candidate P' appears is set as the pole foot position FP. In Step S6, when the vehicle approaches the pole candidate P', pole foot positions FP that change with respect to the vertical edge images acquired in the time series over the prescribed time interval are set in a time series.

In Step S7, following setting of the pole foot positions FP in Step S6, whether or not starting information and ending information has been acquired for the prescribed time interval is evaluated. Here the starting information for the prescribed time interval is information for the starting vehicle velocity Vs and information for the starting detected distance Ls. The ending information for the prescribed time interval is information for the ending vehicle velocity Ve and the ending detected distance Le. Note that the vehicle velocity information and detected distance information that changes with the passage of time from the start until the end of the prescribed time interval may be acquired as a time series. If the evaluation is YES because starting information and ending information has been acquired for the prescribed time interval, processing advances to Step S8. If the evaluation is NO because starting information or ending information has not been acquired for the prescribed time interval, processing returns to the beginning.

In Step S8, following the evaluation in Step S7 that the starting information and the ending information has been acquired for the prescribed time interval, the movement distance VL is acquired and the detected distance difference ΔL is calculated. Here the movement distance VL is the distance moved by the vehicle during the prescribed time interval when the vehicle moves toward the pole candidate P'. The detected distance difference ΔL is the difference in distances between the starting detected distance Ls and the ending detected distance Le, wherein the horizontal distance from the camera position to the pole foot position FP is detected when the vehicle moves toward the pole candidate P'.

In Step S9, following the acquisition of the movement distance VL and the calculation of the detected distance difference ΔL in Step S8, whether or not the absolute value of the difference (|VL−ΔL|) between the movement distance VL and the detected distance difference AL is less than a threshold value is evaluated. If the evaluation is YES because |VL−ΔL|<threshold value, the pole candidate P' is recognized as a pole P that has a pole foot position FP that is a position of contact with the ground, and processing advances to Step S10. On the other hand, if the evaluation is NO because |VL−ΔL|≥ threshold value, the pole candidate P' is recognized as not being a pole P that has a pole foot position FP that is a position of contact with the ground, and processing advances to Step S11.

In Step S10, following the YES evaluation in Step S9, the identification result that there is a pole P wherein the position of contact with the ground is the pole foot position FP is outputted to the automatic brake controller 400, and outputting of the approach distance information that uses the fisheye camera 200 is continued. Processing returns to the beginning after Step S10. Through this, automatic braking control is executed in the automatic brake controller 400 using, as the approach distance information, the horizontal distance to the pole foot position FP of the pole P that is calculated based on the image information of the fisheye camera 200.

In Step S11, following the NO evaluation in Step S9, the identification result that there is no pole P wherein the position of contact with the ground is the pole foot position FP is outputted to the automatic brake controller 400, and outputting of the approach distance information that uses the fisheye camera 200 is terminated. Processing returns to the beginning after Step S11. Thus automatic brake control is executed in the automatic brake controller 400 using, as approach distance information, the detected distance value from the sonar 504, rather than from the fisheye camera 200.

Figure 12:
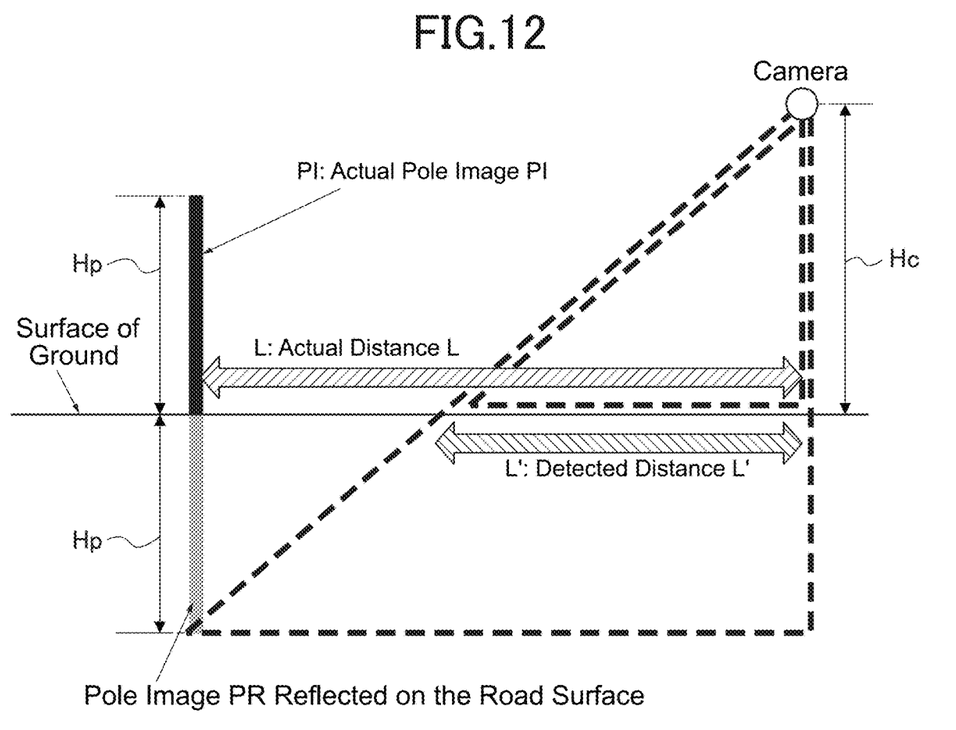
FIG. 12 is a diagram showing the relationship between the actual distance and the detected distance from the camera position to the pole position when the entirety of the pole undergoes a water film surface reflection in a puddle at the pole foot.

FIG. 12 will be referenced next to explain the reason for a false detection of the distance from the vehicle to the pole P when the camera image of the pole P is an image wherein a pole image PR that is reflected on the road surface, because of a puddle, is added to the actual pole image PI.

When detecting the distance from the vehicle to the pole P using a camera image, the pole foot position FP is specified first on the display screen. Following this, the distance from the vehicle to the pole P is detected based on the pole foot position FP on the display screen using a distance conversion formula, or the like, for calculating the distance from the vehicle to the pole P, on the vertical coordinate position of the pole foot position FP on the display screen. That is, when detecting the distance from the vehicle to the pole P, the detected distance is acquired using the pole foot position FP as the reference.

In contrast, when the entirety of the pole undergoes a water film surface reflection on a puddle at the pole foot, the existence of a pole of a length wherein the pole image PR that is reflected on the road surface is added to the actual pole image PI is identified in the camera image, as depicted in FIG. 12.

The reason for this is that when the pole image is reflected on the road surface through a reflection on a water film surface, the pair of vertical edges of the pole image due to the water film surface reflection will remain parallel with the actual pole image, in the downward direction from the pole foot position. Moreover, when the pole image is reflected on the road surface through a water film surface reflection, an image will be produced wherein the actual pole image PI and the pole image PR that is reflected on the road surface through the water film surface reflection will be joined together in a straight line, regardless of whether the approach is in a straight line or the approach is turning (referencing FIG. 9).

Consequently, as depicted in FIG. 12, when the presence of a pole of a length wherein the pole image PR that is reflected on the road surface has been added to the actual pole image PI is recognized, the pole foot position FP will be the bottommost end position of the pole image PR that is reflected on the road surface. Because of this, given that the two triangles drawn in dotted lines in FIG. 12 are similar, the detected distance L' to the pole foot position FP can be represented by the equation $L'=L \times Hc/(Hc+Hp)$, where L is the actual distance (true value), Hc is the height from the fisheye camera 200 to the ground, and Hp is the height of the actual pole P (=the pole height that is reflected on the road surface). As can be appreciated from this formula, assuming, for example, that the height Hc of the fisheye camera 200 from the ground and the height Hp of the actual pole are equal, the detected distance L' will be half of the actual distance L (the true value).

Because, in this way, the detected distance L' will be the distance to the point of intersection of the line connecting the fisheye camera 200 to the bottommost end position of the pole image PR that is reflected on the road surface and the surface of the ground, the distance from the vehicle to the actual pole P will be falsely detected as a distance that is shorter than the true value (the actual distance L).

FIG. 1 will be referenced next to explain the reason why it is possible to identify whether or not the camera image is an image wherein a pole image PR that is reflected on the road surface through a puddle is added, rather than an image that is the actual pole image PI.

Figure 13:
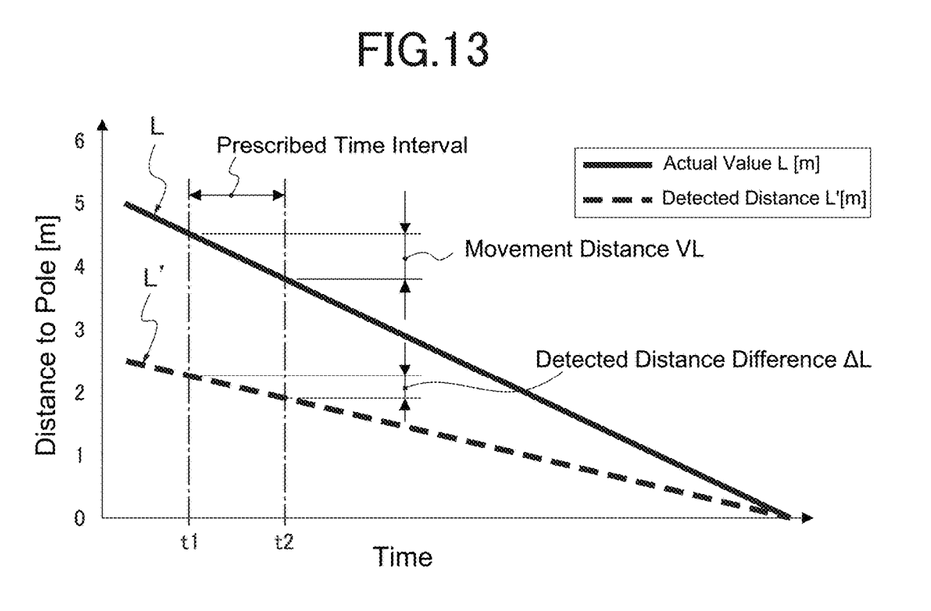
FIG. 13 is a diagram depicting a time series graph wherein the true values and the detected distances for the distances to the pole appear in a time series when the entirety of the pole undergoes a water film surface reflection in a puddle at the pole foot.

The relationship characteristics between the true value L and the detected distance L', in relation to the time until the vehicle collides with the pole P and the distance to the pole P, when the vehicle moves toward the pole P are given in FIG. 13. The true value L that is based on the camera image being an image from the actual pole alone is a longer distance to the pole P, as shown by the solid curve in FIG. 13, when compared to the detected distance L', and thus, will decline with a larger falling slope as time passes than will the detected distance L'. In contrast, if the camera image adds a pole image from a road surface reflection to the image of the actual pole alone, the detected distance L, as indicated by the dotted curve in FIG. 13, will fall with a smaller falling slope with the passage of time than will the true value L, given that the distance to the pole P is shorter than the true value L.

Consequently, when a pole image PR that is reflected on the road surface is added, the range of change in distance in the true value between the starting time t1 and the ending time t2 of the prescribed time interval will be the movement distance VL of the vehicle. The difference between the detected distance L' at the starting time t1 of the prescribed time interval and the detected distance L' at the ending time t2 will be the detected distance difference ΔL. Because of this, the relationship between the movement distance VL of the vehicle and the detected distance difference ΔL will be VL>ΔL.

On the other hand, when the camera image is the actual pole image PI alone, the pole P is stationary, and so the amount of change in the detected pole position (=detected distance difference ΔL) and the amount of change in the vehicle position (=vehicle movement distance VL) will be equal. Because of this, when the camera image is the actual pole image PI alone, the relationship between the vehicle movement distance VL and the detected distance difference ΔL will be VL=ΔL.

Consequently, the vehicle movement distance VL and the detected distance difference ΔL are monitored in a time series, and a condition for considering the detected distance difference ΔL to be equal to the vehicle movement distance VL (that is |VL−ΔL|<threshold value) is applied. Given this, excluding results wherein this condition is not satisfied and leaving those results wherein this condition is satisfied makes it possible to discriminate whether or not a pole candidate identified by a camera image is an image wherein a pole image PR that is reflected on the road surface is added to the actual pole image PI.

Figure 14:
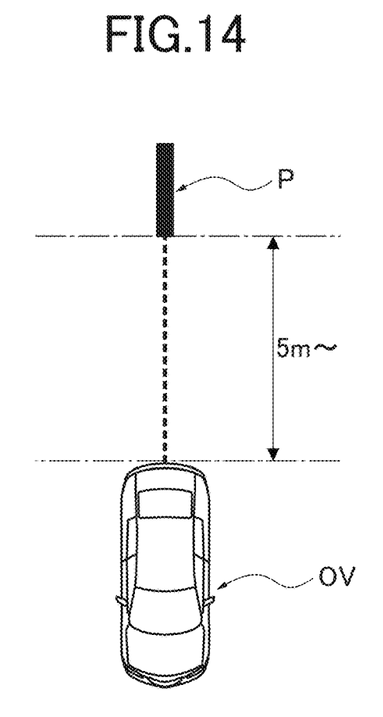
FIG. 14 is an operation explanatory diagram depicting the state of a vehicle approaching a pole through traveling in reverse.
Figure 15:
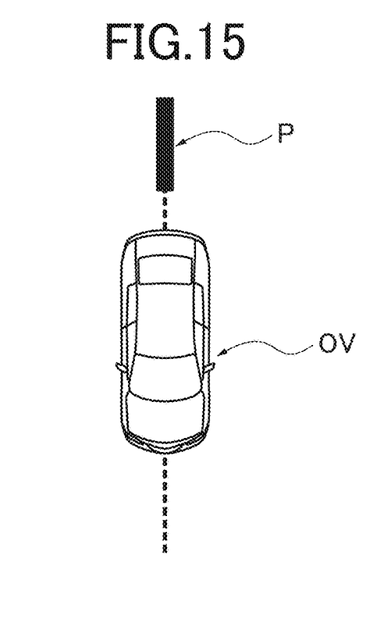
FIG. 15 is an operation explanatory diagram depicting the state wherein the vehicle has stopped at a position immediately prior to a pole, through actuation of automatic braking when the vehicle has approached a pole through traveling in reverse.

FIG. 14 and FIG. 15 will be referenced next to explain an example of automatic brake operation when the vehicle is traveling in reverse.

First, when there is an identification result that there is a pole P with a pole foot position FP that is a position of contact with the ground, then, in the flowchart depicted in FIG. 11, processing advances as the S1→S2→S3→S4→S5→S6→S7→S8→S9→S10. Following this, in Step S10, the identification result that there is a pole P with a pole foot position FP that is a position of contact with the ground is outputted to the automatic brake controller 400, together with outputting the approach distance information that uses the fisheye camera 200. Through this, automatic braking control is executed in the automatic brake controller 400 using, as the approach distance information, the horizontal distance to the pole foot position FP of the pole P that is calculated based on the image information of the fisheye camera 200.

For example, as depicted in FIG. 14 let us assume that a vehicle OV is backing at about 4 km/h toward a pole P the is no less than about 5 m away. When, in this case, the pole P is detected by the fisheye camera 200 and the approach distance information from the camera image is acquired by the automatic brake controller 400, the vehicle OV is decelerated and brought to a stop automatically. That is, as depicted in FIG. 15, the vehicle OV is brought to a stop at a position immediately prior to the pole P, avoiding a collision between the vehicle OV and the pole P.

The image recognizing device 100 and image recognizing method of the first embodiment, explained above, produce the effects listed below.

(1) The image recognizing device 100 comprises: a surroundings state acquiring portion (image storing portion 101 and cylindrical distortion correcting portion 102); a vertical edge extracting portion 103; a column candidate extracting portion 104; a pole candidate evaluating portion 105; a pole foot position setting portion 106; a movement distance acquiring portion 107; a detected distance difference calculating portion 108; and a pole identifying portion 109. The surroundings state acquiring portion acquires, through time series camera image information, the state of the surroundings, which changes accompanying movement of the vehicle on which the camera (fisheye camera 200) is mounted. The vertical edge extracting portion 103 extracts, as vertical edges, those parts wherein there are changes in pixel brightness of no less than a prescribed value when the camera image information is scanned in the horizontal direction. The column candidate extracting portion 104 extracts, as column candidates, those pairs of edges found when the vertical edges are searched for pairs of plus edge +VE peaks and minus edge −VE peaks. The pole candidate evaluating portion 105 evaluates whether or not the column candidates satisfy pole evaluation conditions, and evaluates those column candidates that satisfy the pole evaluation conditions as pole candidate P' that stand on the surface of the ground. The pole foot position setting portion 106 sets, as the pole foot position FP, the bottommost end position of the vertical edge image in which the pole candidate P' appears. The movement distance acquiring portion 107 acquires the movement distance VL moved by the vehicle during a prescribed time interval when the vehicle is moving toward the pole candidate P'. When the vehicle moves approaching the pole candidate P', the detected distance difference calculating portion 108 detects the horizontal distance from the position of the camera to the pole foot position FP, and calculates a detected distance difference ΔL between the detected distance Ls at the start of the prescribed time interval and the detected distance Le at the end thereof. The pole identifying portion 109 identifies that a pole candidate P' wherein the absolute value |VL−ΔV| of the difference between the movement distance VL and the detected distance difference ΔL is less than a threshold value as being a pole P that has a pole foot position FP that is a position of contact with the ground.

That is, when the vehicle moves toward the pole candidate P', the vehicle movement distance VL and the approach distance toward the pole candidate P' (the detected distance difference ΔL) are monitored in a time series. Given this, an identification evaluation of the condition that the vehicle movement distance VL and the distance of movement toward the pole candidate P' will be equal if the pole candidate P is not a pole that is reflected on the road surface is used to identify whether or not the pole candidate P' is a pole P that has a pole foot position FP that is a position of contact with the ground. This enables provision an image recognizing device 100 that prevents false detection of the distance from the vehicle to a pole P, by detecting proximity to the pole P through a camera image when the vehicle is moving toward the pole P.

(2) The column candidate extracting portion 104 extracts, from the edge pairs, those pairs that satisfy the summation value condition that the vertical direction summation value Σ+VE of the plus edge +VE peak positions and the vertical direction summation value Σ−VE of the minus edge −VE peak positions are each no less than the threshold values (+VEth and −VEth) and the horizontal distance condition that the horizontal distance D between the plus edge +VE peak position and the minus edge −VE peak position is no greater than a threshold value Dth.

That is, of the edge pairs that have been extracted, those edge pairs wherein the plus edge +VE and the minus edge −VE appear clearly and wherein the vertical-direction plus edge +VE and minus edge −VE exist in neighboring positions, are extracted as column candidates. Because of this, those edge pairs wherein the plus edge +VE and/or minus edge −VE are unclear, or are present at positions that are away from each other, are excluded, enabling column candidates to be extracted with good accuracy from the edge pairs that have been extracted.

(3) The pole candidate evaluating portion 105 performs an evaluation using pole evaluation conditions of an edge quantity condition that, in the image region below the vicinity of the horizon line in the camera image information, the edge quantities of the right edge and the left edge of the column candidate are no less than a threshold value, an edge width condition that the variation in width of the column candidate is no greater than a prescribed width variation, and an edge direction condition that all of the edge peaks of the column candidate are in the vertical direction. The column candidates that satisfy all of the pole evaluation conditions are evaluated as pole candidates P' that stand on the surface of the ground.

That is, the extracted column candidates are evaluated for an image region precondition, an edge quantity condition, an edge width condition, and an edge direction condition, and the column candidates that satisfy all of the pole evaluation conditions are evaluated as pole candidates P' that stand on the surface of the ground. Because of this, column candidates that are the appearance of pole shadows PS and column candidates through road surface painting, such as white lines WL that are painted on the road surface are excluded, enabling the pole candidates P' to be evaluated accurately from among the extracted column candidates.

(4) A display device 300 that has a display screen 301 for display time series camera image information, and a distance conversion map setting portion 110 for setting a distance conversion map for calculating the horizontal distance to the pole foot position FP from the position wherein the fisheye camera 200 is installed, from the vertical direction coordinate position, on the screen, of the pole foot position FP that is displayed on the display screen 301 are provided. When the vertical direction coordinate position of the pole foot position FP in the display screen 301 is detected at the start of a prescribed time interval, the detected distance difference calculating portion 108 uses the distance conversion map to find a starting detected distance Ls, and when the vertical direction coordinate position of the pole foot position FP in the display screen 301 is detected at the end of the prescribed time interval, the detected distance difference calculating portion 108 uses the distance conversion map to find an ending detected distance Le.

That is, the horizontal distance from the position at which the fisheye camera 200 is installed to the pole foot position FP is found based on the vertical direction coordinate position, on the screen, of the pole foot position FP that is displayed on the display screen 301. Because of this, when calculating the detected distance difference ΔL between the starting detected distance Ls and the ending detected distance Le for the prescribed time interval, the detected distance difference ΔL can be calculated easily through merely detecting the vertical direction coordinate position of the pole foot position FP on the display screen 301.

(5) The camera is a fisheye camera 200. The surroundings state acquiring portion has an image storing portion 101 for storing, in a time series, fisheye images FI acquired by the fisheye camera 200, and a cylindrical distortion correcting portion 102 for converting, into cylindrical distortion corrected images CI, the fisheye images FI that are stored in the image storing portion 101.

That is, a fisheye image FI wherein there is a pole that is standing at a direction that is sloping upward is converted by the cylindrical distortion correcting portion 102 into a cylindrical distortion corrected image CI of a pole that is standing in the vertical direction, which is required for extracting the vertical edges from the camera image. Because of this, camera image information wherein the pole P is standing vertically can be acquired despite using a fisheye camera 200, rather than using a camera that can acquire images without distortion. Note that if the fisheye camera 200 is a vehicle-mounted camera that already exists in the vehicle, use thereof can achieve a reduction in cost.

(6) An automatic brake controller 400 that actuates the brake of the vehicle automatically before the vehicle collides with an obstacle, based on approach information for the obstacle, is provided when the vehicle moves towards an obstacle. The pole identifying portion 109 outputs, to the automatic brake controller 400, the pole identification result of whether or not there is a pole P that has a pole foot position FP that is a position of contact with the ground.

That is, when, as an automatic brake controller 400, approach distance information can be acquired from a position that is far from a pole P that is an obstacle, an early warning can be issued to the driver to operate the brake, which can reduce the frequency of automatic brake actuation. In this regard, approach distance information based on camera image information can be acquired when the position of the vehicle is further from the pole P than is possible in case of approach distance information acquired from a sonar 504, for example, alone. This can respond to the need to acquire approach distance information from a position that is far from the pole P, in automatic braking control, when there is an identification result that there is a pole P that is standing on the ground.

(7) An image recognizing method for identifying a pole that stands on the surface of the ground based on camera image information acquires, from time series camera image information, the state of surroundings, which changes accompanying movement of the vehicle on which the camera (the fisheye camera 200) is installed. A part wherein a change of no less than a prescribed value is produced in the brightness of pixels when the camera image information is scanned in the horizontal direction is extracted as a vertical edge. Those pairs of edges found when the vertical edges are searched for pairs of plus edge +VE peaks and minus edge −VE peaks are extracted as column candidates. Evaluations are performed on the column candidates as to whether or not pole evaluation conditions are satisfied, and evaluates, as a pole candidate that is standing on the ground, a column candidate that satisfies the pole evaluation conditions. The bottommost end position of the vertical edge image in which the pole candidate P' appears are set as the pole foot position FP. The movement distance VL moved by the vehicle during a prescribed time interval when the vehicle is moving toward the pole candidate P' is acquired. When the vehicle moves approaching the pole candidate P', the horizontal distance from the position of the camera to the pole foot position FP is detected, and a detected distance difference ΔL between the detected distance Ls at the start of the prescribed time interval and the detected distance Le at the end thereof is calculated. A pole candidate P' wherein the absolute value $|VL-\Delta V|$ of the difference between the movement distance VL and the detected distance difference ΔL is less than a threshold value is identified as being a pole P that has a pole foot position FP that is a position of contact with the ground.

That is, when the vehicle moves toward the pole candidate P', the vehicle movement distance VL and the approach distance toward the pole candidate P' (the detected distance difference ΔL) are monitored in a time series. Given this, an identification evaluation of the condition that the vehicle movement distance VL and the distance of movement toward the pole candidate P' will be equal if the pole candidate P is not a pole that is reflected on the road surface is used to identify whether or not the pole candidate P' is a pole P that has a pole foot position FP that is a position of contact with the ground. This enables provision an image recognizing method that prevents false detection of the distance from the vehicle to a pole P, by detecting proximity to the pole P through a camera image when the vehicle is moving toward the pole P.

Although an image recognizing device and image recognizing method according to the present disclosure have been explained above based on one embodiment, the specific structure is not limited to this one embodiment. Design changes, additions, and the like, are allowed insofar as there is no deviation from the spirit and intent of the invention according to the various claims.

In the first embodiment, an example was presented wherein a fisheye camera 200 was used as the camera and an image storing portion 101 and a cylindrical distortion correcting portion 102 were used as a surroundings state acquiring portion. However, the camera may instead be one of a standard lens or a wide angle lens that does not produce distortion in the image that is captured, in which case the cylindrical distortion correcting process would be unnecessary. Additionally, when, as the camera and surroundings state acquiring portion, an imaging subject such as, for example, a pole that extends in at least the vertical direction is imaged as the time series camera image, the system may be such that the imaging subject, such as the pole, is outputted as a pair of edges that extend in the vertical direction.

In the first embodiment, an example was presented, as the detected distance difference calculating portion 108, wherein the starting detected distance Ls and the ending detected distance Le for a prescribed time interval were found using a distance conversion map when the vertical direction coordinate position of the pole foot position FP on the display screen 301 was detected. However, there is no limitation to that which uses a distance conversion map for the detected distance difference calculating portion insofar as the distances are found based on the vertical direction coordinate positions on the screen. For example, it may instead be an example wherein the starting detected distance and ending detected distance for the prescribed time interval are found using the height dimension to the camera and a declination angle from the camera position to the pole foot position.

In the first embodiment, an example was presented wherein the image recognizing device 100 was applied to a collision damage mitigating braking system A equipped with an automatic brake controller 400. However, the image recognizing device according to the present disclosure can be applied not only to collision damage mitigating braking systems, but also to parking assisting systems and obstacle avoidance assisting systems wherein distance information to a pole that stands on the surface of the ground is used as information to support the operations thereof.

In the first embodiment an example was presented wherein the image recognizing device 100 was applied to a vehicle OV that is a passenger vehicle. However, the application of the image recognizing device according to the present disclosure is not limited to passenger vehicles, but can be applied to large vehicles, such as trucks and buses, and to a variety of other vehicles.

What is claimed is:

1. An image recognizing device, comprising:
   a surroundings state acquiring portion configured to acquire a state of surroundings that changes accompanying movement of a vehicle on which a camera is mounted through time-series camera image information;
   a vertical edge extracting portion configured to extract, as a vertical edge, a part where there is a change in pixel brightness of no less than a prescribed value when the camera image information is scanned in the horizontal direction;
   a column candidate extracting portion configured to extract, as a column candidate, a pair of edges found when the vertical edges are searched for pairs of a plus edge peak and a minus edge peak;
   a pole candidate evaluating portion configured to evaluate whether or not a column candidate satisfies a pole evaluation condition and evaluate a column candidate that satisfies the pole evaluation condition as a pole candidate extending from the ground;
   a pole foot position setting portion configured to set a bottommost end position of a vertical edge image wherein a pole candidate appears as a pole foot position;
   a movement distance acquiring portion configured to acquire a movement distance moved by the vehicle during a prescribed time when the vehicle is moving toward the pole candidate;
   a detected distance difference calculating portion configured to calculate a detected distance difference between a starting detected distance and an ending detected distance for the prescribed time by detecting the horizontal distance from the camera position to the pole foot position when the vehicle is moving toward the pole candidate;
   a pole identifying portion configured to identify, the edge position of the bottommost end of the pole candidate where the absolute value of a difference between the movement distance and the detected distance difference is less than a threshold value, as the pole foot position of the pole; and
   an automatic brake controller for automatically actuating a brake of the vehicle, prior to the vehicle colliding with an obstacle, based on approach distance information for the obstacle, when the vehicle approaches the obstacle, wherein:
   the pole identifying portion outputs, to the automatic brake controller, a pole identification result of whether or not there is a pole that has a pole foot position that is a position that is in contact with the ground.

2. The image recognizing device according to claim 1, wherein:
   the column candidate extracting portion extracts, as a column candidate, an edge pair that satisfies a summation value condition wherein a vertical direction summation value of peak positions of the plus edge and a vertical direction summation value of peak positions of the minus edge each is no less than a threshold value, and a horizontal distance condition wherein the horizontal distance of the peak position of the plus edge and the peak position of the minus edge is no greater than a threshold value.

3. The image recognizing device according to claim 1, wherein:
   the pole candidate evaluating portion evaluates, in an image region below the vicinity of a horizon line in the camera image information, an edge quantity condition that the edge quantities of the right end and the left and of the column candidate are no less than a threshold value, an edge width condition that the variation in width of the column candidate is no more than a prescribed width variation, and an edge direction condition wherein all of the edge peaks of the column candidate are in the vertical direction, wherein:
   a column candidate that satisfies all of the pole evaluation conditions is evaluated as a pole candidate that extends from the surface of the ground.

4. The image recognizing device according to claim 1, comprising:
   a display device configured to have a display screen for displaying time series camera image information; and
   a distance conversion map setting portion configured to set a distance conversion map for calculating a horizontal distance from a position of the camera which mounted on the vehicle to the pole foot position, from a vertical direction coordinate position, on the screen, of the pole foot position that is displayed on the display screen, wherein:
   when a vertical direction coordinate position of the pole foot position is detected on the display screen at the start of the prescribed time, the detected distance difference calculating portion uses the distance conversion map to find the starting detected distance, and when the vertical direction coordinate position of the pole foot position is detected on the display screen at the end of the prescribed time, the detected distance difference calculating portion uses the distance conversion map to find the ending detected distance.

5. The image recognizing device according to claim 1, wherein:
the camera is a fisheye camera; and
the surroundings state acquiring portion comprises an image storing portion for storing, in a time series, fisheye images acquired by the fisheye camera, and a cylindrical distortion correcting portion for converting, into cylindrical distortion corrected images, a fisheye image that is stored in the image storing portion.

6. An image recognizing method for identifying a pole that extends from a surface of the ground, based on camera image information, wherein:
a state of surroundings that changes accompanying movement of a vehicle on which a camera is mounted is acquired through time series camera image information;
a change of no less than a prescribed value is produced in the brightness of pixels when the camera image information is scanned in the horizontal direction is extracted as a vertical edge;
a pair of edges found when the vertical edges are searched for pairs of a plus edge peak and a minus edge peak is extracted as a column candidate;
whether or not a column candidate satisfies a pole evaluation condition is evaluated to evaluate, as a pole candidate that extends from the surface of the ground, a column candidate that satisfies the pole evaluation condition;
a bottommost end position of a vertical edge image wherein a pole candidate appears is set as a pole foot position;
a movement distance moved by the vehicle over a prescribed time interval when the vehicle is moving toward the pole candidate is acquired;
a detected distance difference between a starting detected distance and an ending detected distance for a prescribed time interval is calculated by detecting the horizontal distance from the camera position to the pole foot position when the vehicle is moving toward the pole candidate;
a pole candidate wherein the absolute value of a difference between the movement distance and the detected distance difference is less than a threshold value is identified as a pole that has, as the pole foot position, a position that is in contact with the ground; and
outputting to an automatic brake controller that automatically actuates a brake of the vehicle, prior to the vehicle colliding with an obstacle, based on approach distance information for the obstacle, when the vehicle approaches the obstacle, a pole identification result of whether or not there is a pole that has a pole foot position that is a position that is in contact with the ground.

* * * * *